United States Patent [19]

Dandre et al.

[11] Patent Number: 5,788,209
[45] Date of Patent: Aug. 4, 1998

[54] CENTERING MAINTAINING ELASTIC MOUNT FOR VEHICLE ENGINE

[75] Inventors: Jacques Dandre; Gilles Chenais; Joël Menager, all of Chateaudun, France

[73] Assignee: Hutchinson, Paris, France

[21] Appl. No.: 679,066

[22] Filed: Jul. 12, 1996

[30] Foreign Application Priority Data

Jul. 20, 1995 [FR] France ............... 95 08803

[51] Int. Cl.$^6$ ............... F16M 13/00; F16F 15/08
[52] U.S. Cl. ............... 248/635; 248/634; 267/140.12; 267/150
[58] Field of Search ............... 248/634, 635; 267/140.12, 140.2, 150

[56] References Cited

U.S. PATENT DOCUMENTS

| | | | |
|---|---|---|---|
| 4,697,795 | 10/1987 | West | 267/140.12 X |
| 5,129,479 | 7/1992 | Fujii et al. | |
| 5,344,126 | 9/1994 | Ishiyama | 267/140.12 |
| 5,551,675 | 9/1996 | Simuttis et al. | 267/140.12 X |

FOREIGN PATENT DOCUMENTS

| | | | |
|---|---|---|---|
| 955900 | 1/1950 | France | 248/635 |
| 679404 | 9/1952 | United Kingdom | |
| 737825 | 10/1955 | United Kingdom | 248/634 |

OTHER PUBLICATIONS

Ingenieurs De L'Automobile, No. 11/12, Nov. 1987, pp. 680–685, "Les Articulations Elastiques".

*Primary Examiner*—David M. Purol
*Assistant Examiner*—Gregory J. Strimbu
*Attorney, Agent, or Firm*—Larson & Taylor

[57] ABSTRACT

An elastic mount for a vehicle engine including an outer armature (1) intended to be connected to the engine, an inner armature (2) intended to be connected to the body (4) of the vehicle, and arms (5) made of elastic material connecting these two armatures together. The elastic material is bonded to the inner armature via the respective ends, of the arms the inner armature thus is radially covered with the elastic material. The two armatures have respectively complementary bearing surfaces capable of interacting so as to maintain the mutual centering of these two armatures in the axial direction in which the bearing surfaces are nested together as long as the mount is not subjected to the load of the engine. This interaction and the maintaining of centering are both automatically eliminated as soon as the mount is loaded by the engine.

7 Claims, 2 Drawing Sheets

5,788,209

1

CENTERING MAINTAINING ELASTIC MOUNT FOR VEHICLE ENGINE

FIELD OF THE INVENTION

The present invention relates to an elastic mount for vehicle engine including an outer armature intended to be connected to the engine, an inner armature intended to be connected to the body of the vehicle, and arms made of elastic material connecting these two armatures together, being bonded thereto via their respective ends, the inner armature thus being covered in the material, this making it possible for this mount to be deformed elastically when forces, due especially to the weight of the engine, are exerted between the armatures in a vertical direction.

BACKGROUND OF THE INVENTION

The problem that the present invention sets out to solve is that of maintaining the centering of these two armatures relative to each other when the engine is installed. Basically, such a mount has a low rigidity in the horizontal direction in which the inner armature could come out of or "dislocate" from the outer armature, the direction termed "axial" or "X" hereafter.

It is therefore important, at the time of this installation, to avoid misalignment of the two armatures by relative offset in this axial direction, which mis-alignment would obviously detract from the elastic properties of the mount after it is loaded up.

A known solution consists in fitting a rigid wedge, for example one made of plastic, in between the two armatures in order to immobilize them one relative to the other in the axial direction during fitting, this wedge having to be extracted after the mount is loaded up.

The drawback of this solution lies in the fact that the extraction of the wedge may be omitted or difficult during fitting, and that the mount then loses any elastic function.

SUMMARY OF THE INVENTION

The present invention therefore sets out to solve the problem thus posed by eliminating this drawback.

To this end, a mount of the general type defined herein above is, in accordance with the present invention, essentially characterized in that the two armatures have respectively complementary bearing surfaces capable of interacting so as to maintain the mutual centering of these two armatures in the axial direction defined hereinabove as long as the mount is not subjected to the load of the engine, this interaction and the maintaining of centering which it provides both being automatically eliminated as soon as the mount is loaded up by the engine.

In this way, there is no longer any need to extract a wedge after fitting, which radically avoids the risk mentioned hereinabove.

In advantageous embodiments, recourse is further had to one and/or other of the following arrangements:

the outer armature consists of a cylindrical sleeve with generatrices parallel to the axial direction, and the inner armature consists of a cylindrical core with generatrices parallel to the axial direction and the complementary bearing surfaces of the two armatures are respectively stops and cavities arranged at the internal upper face of the base of the sleeve and at the lower face of the core in such a way that the stops are engaged vertically in the cavities when the mount is at rest, thus preventing relative displacements of the two armatures in the axial direction,

2 and on the other hand are vertically disengaged from these cavities when the mount is loaded up, in a mount according to the previous paragraph, the complementary bearing surfaces of the two armatures consist respectively of the base of the sleeve and of a complementary groove, open downwards, hollowed from the lower face, lined with elastic material, of the core, the edges of the groove being capable contiguously of capping the base of the sleeve as long as the mount is not loaded up, in a mount according to the paragraph before last, the portion, of the sleeve, which interacts vertically with the core is a spacer piece attached on the inside of this sleeve, in a mount according to the previous paragraph, the two complementary bearing surfaces consist respectively of a slot hollowed from the spacer piece and running in the horizontal direction perpendicular to the axial direction, and of a complementary relief provided at the base of the core.

Apart from these main arrangements, the invention comprises certain other arrangements which are preferably used at the same time and which will be dealt with more fully hereinbelow.

BRIEF DESCRIPTION OF THE DRAWINGS

In that which follows, two preferred embodiments of the invention will be described with reference to the drawings appended hereto in a way which of course implies no limitation.

FIG. 2' an alternative, embodiment of a rim of the elastic material depicted in FIG. 2.

DESCRIPTION OF THE PREFERRED EMBODIMENTS

Figure 1:
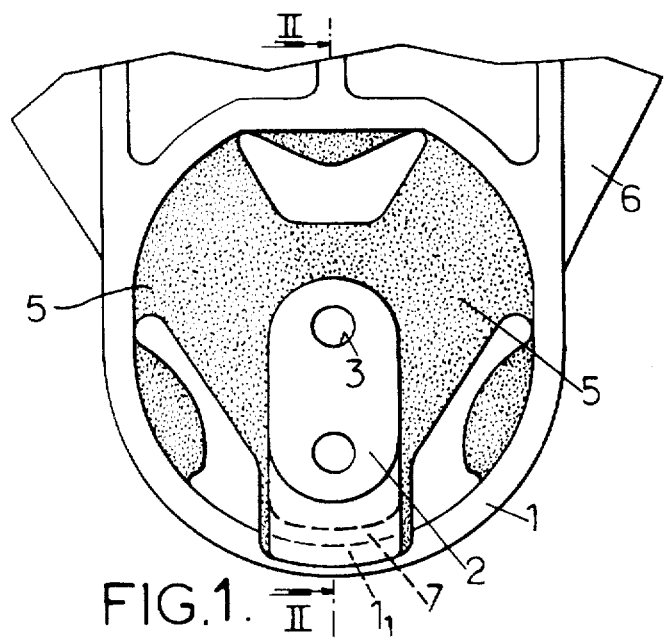
FIG. 1, of these drawings, shows the mount according to the first embodiment in elevation, in the free or "at rest" state, that is to say before fitting and loading up.

In each case, the mount comprises:

an outer armature 1 in the form of a cylindrical sleeve or ring, the generatrices of which are parallel to a horizontal direction X hereafter termed "axial", this outer armature 1 being slightly vertically elongate (oval) in the first case (FIGS. 1 to 4) while outer armature 1a is axisymmetric (having an axis of symmetry—i.e., circular) in the second case (FIGS. 5 to 8), an inner armature 2 in the form of a solid oval cylindrical core the generatrices of which are again parallel to the X direction, this inner armature 2 being pierced with one or two bores 3 running in the X direction for accommodating members for fixing to the body 4 (omitted for clarity from FIGS. 1 and 3) of a vehicle, and two arms 5 in the shape of a V joining the two armatures 1 and 2 together and consisting of a mass of elastic material which completely radially covers or surrounds the inner armature 2.

The outer armature 1 is connected to the crankcase of the engine of the vehicle via appropriate connecting pieces 6 which may be moulded integrally with this outer armature 1 or constitute a bearing therefor.

The portion, of the mass of elastic material forming the arms 5, which radially covers or surrounds the lower face of the inner armature 2 constitutes an elastic coating 7 of this lower face, the coating being bonded to the lower face and to the lower face only.

In the first embodiment illustrated by FIGS. 1 to 4, the lower face of the inner armature 2, lined with the coating 7, is in the form of a groove 8 curved similarly to the base $1_1$ of the outer armature 1, which base lies just below the groove.

Figure 2:
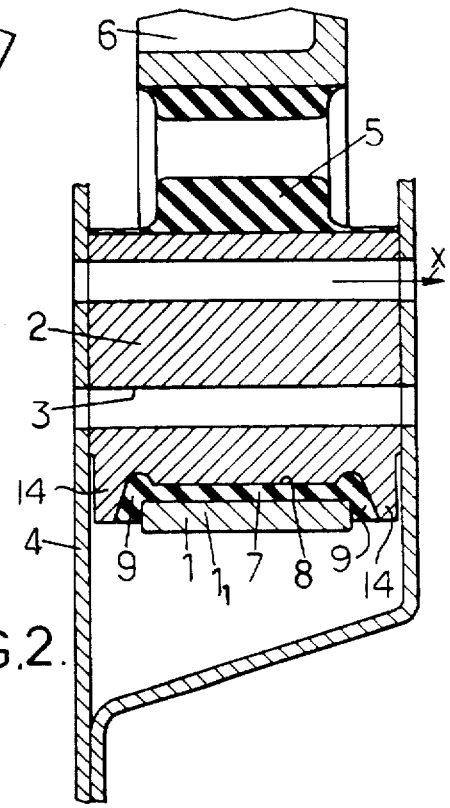
FIG. 2 is a view in axial section on section line II—II of FIG. 1.
Figure 2:
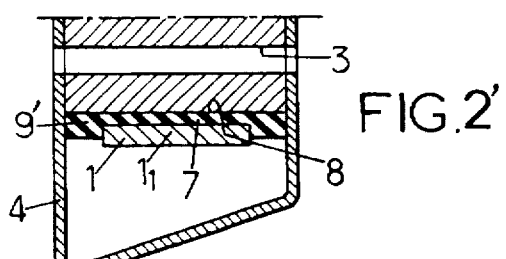

The shape and dimensions of this groove 8 are chosen so that when the mount is in the free or "at rest" state or the elastic material is in a non-suspension configuration, which is its state before fitting, and which is illustrated in FIGS. 1 and 2, it contiguously caps or covers the base $1_1$ of the outer armature 1, and hence acts as something which secures the two armatures 1 and 2 together in the X direction.

This securing is performed in a relatively flexible way given that the two edges of the groove 8, covered by elastic rims 9 laterally delimiting the layer of coating 7 which lines the groove 8, can be compressed to a greater or lesser extent in the X direction between the sleeve 1 and lugs 14 of the inner armature 2.

The assembly is designed so that as soon as the mount is loaded up by the engine after this mount has been fitted or the elastic material is then in a suspension configuration, the resulting relative downwards loading F (FIGS. 3 and 4) of the outer armature 1 connected to the engine, relative to the inner armature 2 connected to the body 4, has the effect automatically of vertically disengaging the base $1_1$ of the outer armature 1 out of the groove 8, and engagement with coating 7 which frees the inner armature 2 relative to the outer armature 1 in the X direction.

Figure 3:
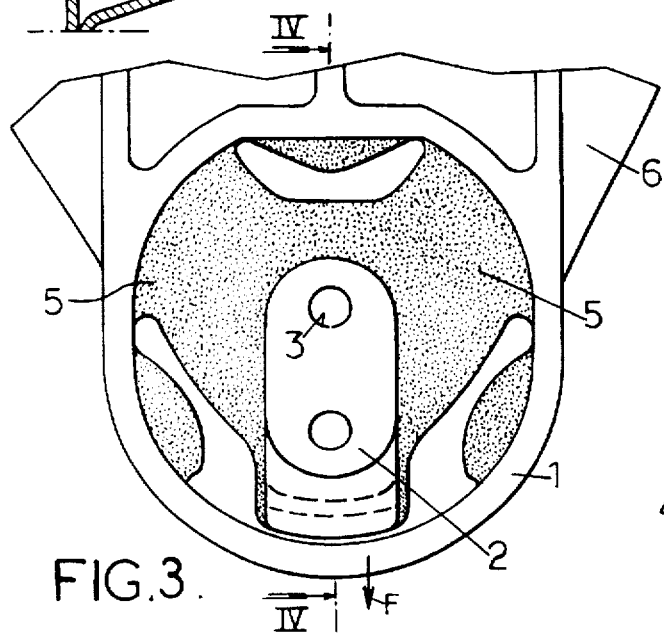
FIGS. 3 and 4 show the same mount after it has been loaded up, respectively in elevation and in vertical section on section line IV—IV of FIG. 3.
Figure 4:
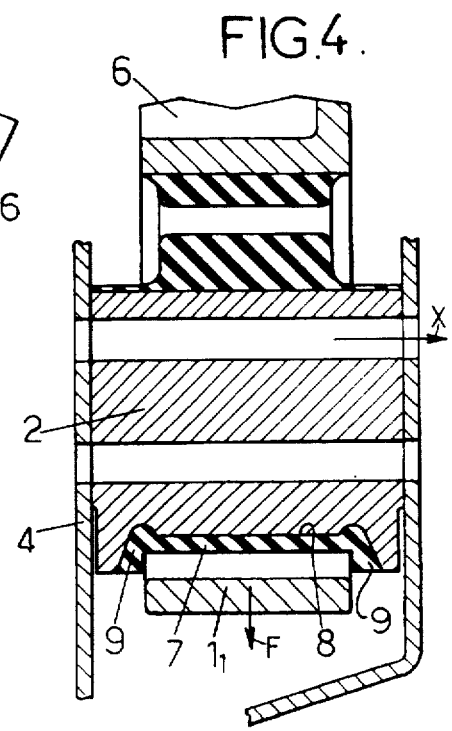
Figure 5:
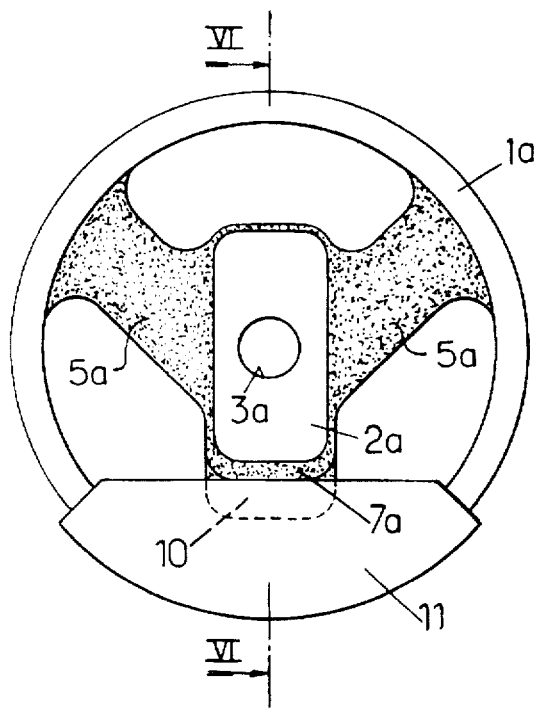
FIG. 5 shows the mount according to the second embodiment, in elevation and in the free state.
Figure 6:
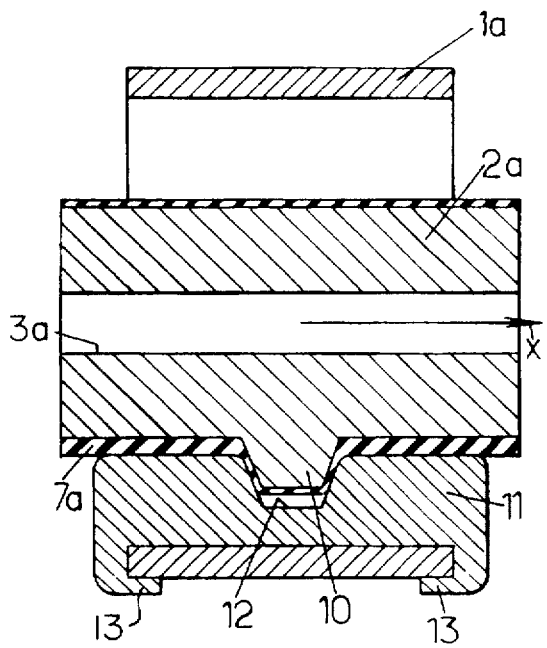
FIG. 6 is a view in vertical section on section line VI—VI of FIG. 5.

The resulting relative lowering which results from this loading of the outer armature 1 relative to the core 2 is visible in FIGS. 3 and 4, showing the mount in its loaded-up state.

In the second embodiment illustrated by FIGS. 5 to 8, similar elements to the first embodiments are identified with the same number having an "a" suffix. In the second embodiment, there is no longer the groove 8 formed in the lower face of the core 2a, but a relief 10 projecting from the central region of this lower face, this relief 10 consisting especially of a pad or of a rib with a V-shaped profile running in the horizontal direction perpendicular to the X direction.

Furthermore, a spacer piece 11 is attached to the base of the outer armature 1a, inside this base, the upper face of this spacer piece 11 being hollowed out with a slot or some other cavity 12, the shape of which complements that of the relief 10.

Figure 7:
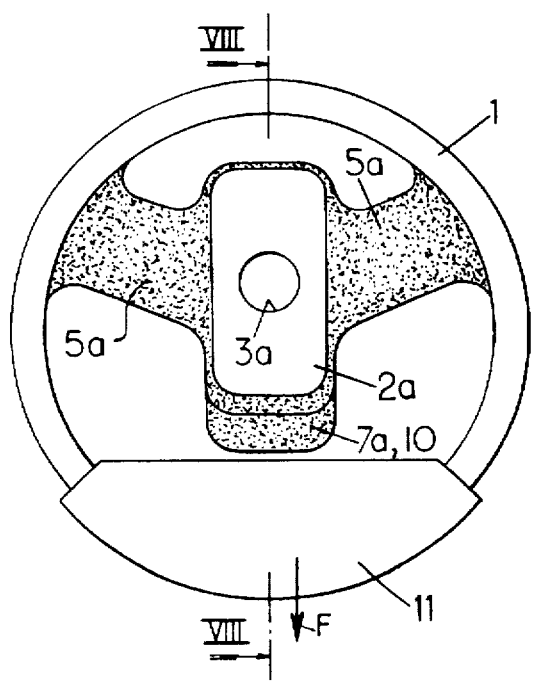
FIGS. 7 and 8 show the said second mount after loading up, respectively in elevation and in vertical section on section line VIII—VIII of FIG. 7.
Figure 8:
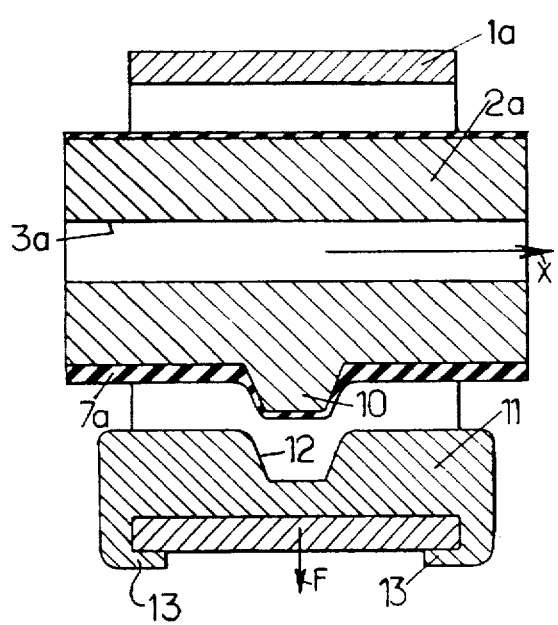

It is readily understood that, here too, the vertical insertion of the relief 10, lined with the elastic coating 7a in the hollow or cavity 12, provides the relative centering of the two armatures 1a and 2a in the X direction and that the automatic vertical disengagement of the relief 10 out of the cavity 12 due to the loading up of the mount by the engine, illustrated by the arrow F, automatically frees the two armatures 1a and 2a from one another in the X direction (See FIGS. 7–8).

The spacer piece 11 may be crimped to the outer armature 1a by knocking tabs 13 bordering this spacer piece 11 over onto this outer armature 1b.

In all cases, the coating 7 or 7a may act as an elastic stop to limit the bouncing travel of the engine when the outer armature 1 or 1a connected to this engine is urged abruptly upwards relative to the armature 2 or 2a connected to the body.

The alternative form of FIG. 2' shows the possibility of dispensing with the metal lugs 14 as well as with the elastic rims 9 which are visible in FIGS. 2 and 4. The effect of these rims is replaced by an increased thickness 9' of the coating 7 on each side of the outer armature 1, it being possible for this increased thickness to be slightly preloaded between this outer armature 1 and the body 4 in order to eliminate any play in the X direction or to increase the rigidity in this direction before application of the load of the engine in the vertical direction.

We claim:

1. An elastic mount for suspending two elements relative to one another, said elastic mount comprising:

an outer armature adapted to engage one of the two elements;

an inner armature located radially inside of said outer armature and adapted to engage the other of the two elements;

said inner and outer armatures each having a complementary interlocking bearing surface; and an elastic material surrounding said inner armature and connecting said inner armature to said outer armature, said elastic material being movable by a compression thereof from (a) a non-suspension configuration where said interlocking bearing surfaces are interlocked with one another to (b) a suspension configuration where said interlocking bearing surfaces are not interlocked with one another and where said inner and outer armatures are capable of moving elastically with respect to one another in a radial direction which is vertical, in a radial direction which is horizontal, and in an axial direction which is perpendicular to the vertical and horizontal radial directions, whereby when said elastic material is in the non-suspension configuration, said bearing surfaces are biased against one another in the vertical radial direction by said elastic material such that interlocking of said inner and outer armatures occurs which provides a mutual centering of said inner armature in said outer armature in the horizontal radial direction and in the axial direction, and when said elastic material is in the suspension configuration, said elastic material is compressed in the vertical radial direction such that said bearing surfaces are no longer interlocked and hence said inner and outer armatures are no longer interlocked.

2. An elastic mount as claimed in claim 1:

wherein said outer armature is an elongate sleeve having a longitudinal axis parallel to the axial direction and an oval cross section perpendicular to the longitudinal axis;

wherein said inner armature is an elongate core having a longitudinal axis parallel to the axial direction and an oval cross section perpendicular to the longitudinal axis of said core;

wherein said bearing surface of said outer armature is one of a stop and a cavity arranged at an internal upper face of a lower base portion of said sleeve; and wherein said bearing surface of said inner armature is the other of said stop and cavity arranged at a lower face of said core vertically opposite to said bearing surface of said outer armature such that said bearing surfaces are movable away from one another in the vertical radial direction when said elastic material is moved from the non-suspension configuration to the suspension configuration.

3. An elastic mount as claimed in claim 2:
wherein said bearing surface of said outer armature is said stop; and
wherein said bearing surface of said inner armature is said cavity lined with said elastic material, said elastic material in said cavity including axial edges in engagement with axial edge portions of said sleeve when said elastic material is in the non-suspension configuration.

4. An elastic mount as claimed in claim 2:
wherein said lower base portion of said sleeve comprises a spacer piece, said spacer piece extending in the vertical radial direction.

5. An elastic mount as claimed in claim 4:
wherein said bearing surface of said outer armature provided on said spacer piece is said cavity extending both in the axial direction and the horizontal radial direction; and
wherein said bearing surface of said inner armature said stop which extends away from said core in the axial direction and the horizontal radial direction.

6. An elastic mount as claimed in claim 1, wherein said outer armature is adapted to be connected to an engine and said inner armature is adapted to be connected to a vehicle body.

7. An elastic mount as claimed in claim 1, wherein said elastic material includes two arms extending from said inner armature and bonded at ends of said arms to said outer armature, said arms being compressed when said elastic material is in the suspension configuration.

* * * * *